(12) United States Patent
Frantz (10) Patent No.: US 10,385,880 B2
(45) Date of Patent: Aug. 20, 2019

(54) MOTOR SOFT SHIFT FEATURE

(71) Applicant: Danfoss Power Solutions, Inc., Ames, IA (US)

(72) Inventor: Stephen Frantz, Ames, IA (US)

(73) Assignee: Danfoss Power Solutions Inc., Ames, IA (US)

( * ) Notice: Subject to any disclaimer, the term of this patent is extended or adjusted under 35 U.S.C. 154(b) by 148 days.

(21) Appl. No.: 15/481,731

(22) Filed: Apr. 7, 2017

(65) Prior Publication Data

US 2018/0291932 A1   Oct. 11, 2018

(51) Int. Cl.

| | | |
|---|---|---|
| F15B 13/02 | (2006.01) | |
| F04B 49/00 | (2006.01) | |
| F03C 1/06 | (2006.01) | |
| F03C 1/40 | (2006.01) | |
| F16H 61/46 | (2010.01) | |
| F15B 11/04 | (2006.01) | |
| B60T 13/24 | (2006.01) | |

(Continued)

(52) U.S. Cl.
CPC ............ *F15B 13/02* (2013.01); *F03C 1/0668* (2013.01); *F03C 1/0686* (2013.01); *F04B 49/002* (2013.01); *F15B 11/04* (2013.01); *F16H 61/46* (2013.01); *B60T 13/245* (2013.01); *F16H 61/423* (2013.01); *F16H 61/47* (2013.01)

(58) Field of Classification Search
CPC .............................. F16H 61/423; F03C 1/0686
See application file for complete search history.

(56) References Cited

U.S. PATENT DOCUMENTS 5,184,466 A * 2/1993 Schniederjan ........ F16H 61/421
60/448
5,653,107 A * 8/1997 Beck ..................... F16H 61/435
60/452

(Continued)

FOREIGN PATENT DOCUMENTS

| CN | 101871477 A | 10/2010 | |
|---|---|---|---|
| DE | 3227452 A1 * | 2/1983 | ............ F03C 1/0694 |

(Continued)

OTHER PUBLICATIONS

European Search Report for Serial No. EP 18 16 5932 dated Jul. 31, 2018.

*Primary Examiner* — Thomas E Lazo
(74) *Attorney, Agent, or Firm* — McCormick, Paulding & Huber LLP (57) ABSTRACT

A hydraulic unit includes a driving mechanism whose displacement volume is adjustable to two operational states by means of a position-able adjustment element. The adjustment element can be positioned by a servo piston of a servo unit into a first, initial position and a second, operative position. A first front face and a second front face of the servo piston, which are opposing each other, can be pressurized individually with pressurized hydraulic fluid in order to position the servo piston at either end position of a servo cylinder of the servo unit. The servo piston is of a stepped design thereby forming a ring-shaped damping surface opposing the first front face. In the servo cylinder a ring-shaped shoulder surface is formed opposing the damping surface such that a damping volume is formed in the servo cylinder by the damping surface, the shoulder surface and the servo cylinder.

16 Claims, 5 Drawing Sheets

(51) Int. Cl.
   *F16H 61/423*   (2010.01)
   *F16H 61/47*   (2010.01)

(56) References Cited

U.S. PATENT DOCUMENTS

| | | | |
|---|---|---|---|
| 5,907,952 A | 6/1999 | Akasaka et al. | |
| 6,179,570 B1 * | 1/2001 | Smith | F04B 49/002 |
| | | | 417/212 |
| 7,163,078 B2 * | 1/2007 | Moya | B62D 11/183 |
| | | | 180/305 |
| 7,415,821 B2 * | 8/2008 | Heinz et al. | F03C 1/003 |
| | | | 60/445 |
| 7,987,668 B2 * | 8/2011 | Kakino | F15B 15/18 |
| | | | 60/452 |

FOREIGN PATENT DOCUMENTS

| | | | |
|---|---|---|---|
| DE | 3227452 A1 | | 2/1983 |
| JP | H04136489 | * | 5/1992 |
| JP | H04136489 A | | 5/1992 |
| JP | H0688575 A | | 3/1994 |

* cited by examiner

MOTOR SOFT SHIFT FEATURE

TECHNICAL FIELD

The present disclosure relates to a hydraulic unit, in particular to a hydraulic motor.

BACKGROUND

Hydraulic motors of the state of the art generally comprise a servo control system with a servo piston slidable disposed in a servo cylinder. The servo piston acts via piston rod on an adjustment element for adjusting the stroke of the hydraulic motor. The position of the servo piston is controlled by supplying or draining hydraulic fluid to or from an end face of the servo piston under control of a control unit acting on a control valve. Such a hydraulic unit featuring a two-position variable axial piston hydraulic motor is described in Chinese Patent CN 101871477 A, for example.

Two-position hydraulic motors are usually designed for low cost and small package size. Thereby a shifting pressure derived usually from a system pressure higher than a case pressure acts at least on the first front face of the servo piston. However, if the shifting pressure level fluctuates around a predetermined pressure level for shifting the servo piston to either position of the two end positions, the servo piston changes abruptly from one end position in the servo cylinder to the other, i.e. the servo piston changes its position without intermediate positions from its initial position abruptly into the operated position and vice versa. Therefore abrupt changes in the displacement of the motor are caused, which are difficult to control. On one hand quick and controlled changes in the servo piston position are desired to achieve short reaction times of the hydraulic unit. On the other hand these abrupt changes are caused too by unsteady system pressures acting immediately on one of the front faces of the servo piston. In common designs changes in the high pressure or system pressure influence the shifting pressure directly, wherein these changes in the high pressure or in the system pressure can be/are triggered also by work load changes in operation of the hydraulic unit. This makes a control of the shifting performance and the propel/breaking behaviour of known hydraulic units even more difficult.

These abrupt changes in the displacement volume of the driving unit leads to an unsteady, non-smooth behaviour of the hydraulic unit and the propel unit associated therewith, especially with regard to the breaking/acceleration behaviour of two-position hydraulic units. In two-position units the initial servo piston position defines either the maximum displacement volume of the drive unit of the hydraulic unit, and the operated servo piston position defines the minimum displacement volume or vice versa. This means further that the changes of position of the servo piston causes the hydraulic unit to change from maximum performance to minimum and vice versa. Such that abrupt changes in the performance are received by the operator of a hydraulic unit like a "digital" stop and go behaviour which makes him difficult to control the hydraulic application.

Further, abrupt changes in the performance of a hydraulic unit require a robust design of the support/mounting elements within the hydraulic unit, which have to bear the high and quickly changing alternating forces. This in turn leads to respective big components and package sizes as casings, bearings, bearing zones, etc., have to be designed accordingly robust and/or massive. This often leads furthermore, especially when using low-cost materials, to respective heavy-weight hydraulic units.

SUMMARY

It is an object of the present disclosure to provide a hydraulic unit that remedies the problems of the state of the art and that provides a smother, better control- and predictable shifting between the operational states of the servo unit and therewith of the associated two-position hydraulic unit. Thereby it is object of the present invention too, to provide a simple design for a hydraulic unit which can be manufactured cost-effective and whose construction is robust and relatively light-weight, at the same time.

The addressed object of the invention is solved by a hydraulic unit according to claim 1 having a driving mechanism whose displacement volume is adjustable to two operational states by means of a position-able adjustment element. The adjustment element itself can be positioned by means of a servo piston of a servo unit into a first, initial position and a second, operative position. A first front face and a second front face of the servo piston, which are opposing each other, can be pressurized individually with pressurized hydraulic fluid in order to position the servo piston at one end position of two end positions of a servo cylinder of the servo unit. According to the invention the servo piston is of a stepped design thereby forming a ring-shaped damping surface opposing the first front face. In the servo cylinder a ring-shaped shoulder surface is formed opposing the damping surface such that a damping volume is formed in the servo cylinder by the damping surface, the shoulder surface and the servo cylinder.

In one exemplary embodiment of the invention the hydraulic unit is at maximum displacement when the servo piston is in its initial position. This provides for instantaneous start at maximum torque of the hydraulic unit. Contrary to two-position hydraulic units known from the state of the art, the adjustment element is moved in a damped manner to its operated position, where the hydraulic unit shows its minimum displacement volume and minimum torque. This happens, when a pressure higher than a threshold pressure for shifting the servo piston—hereinafter called shifting pressure—acts on the first front face of the servo piston. Due to the damping effect of the damping volume in the servo unit neither the servo piston nor the adjustment element is stroked hardly against a stop in the servo cylinder or the casing, respectively. The damping volume which has to be displaced by the servo piston to a region with lower pressure provides for a smooth and even shift rate of the servo piston and the adjustment element towards their respective second, operated positions. Due to this lower shift rate potentially unsafe machine operational states can be avoided, as the lower shift rate provides for more time for controlling the actual adjustment element position and its shift rate.

With arranging a damping volume in the servo unit, which damps the servo piston motion towards the second, operated servo piston position, changes in the high pressure level acting on the first front face of the servo piston are dampened such that abrupt motions of the servo piston are slowed down, however, such motions are still quick enough in order to achieve short reaction times for intended adjustments of the displacement volume of the driving mechanism of the hydraulic unit. Of course the damping level can be set in the design face by a person with relevant skills in the art to any suitable level including the possibility for an adjustable damping level by means of an adjustable orifice in a damping drainage line or in damping flow passages, respectively. Thereby one can think about a manually adjustable damping level orifice, e.g., adaptable only once to the specific propel application, in which the hydraulic unit is used, or adaptable in a dynamic way, e.g. self-adaptive or in a self-adjusting manner according to the performance level of the hydraulic unit. In this connection, mentioned or not, all possibilities for adjusting the damping level a person with relevant skills in the art can think of are covered by the inventive idea—providing a damping volume within the servo unit, in particular within the servo cylinder.

With arranging a damping volume inside the servo unit the diameter of the hydraulic line for supplying shift pressure to the servo unit can be selected bigger in as it is the case with servo units known from the state of the art without damping volume. In the state of the art hydraulic units the diameter of these hydraulic lines is selected to a minimum diameter in order to achieve a low and therefore better controllable shift rate. However, due to contamination reasons a minimum diameter must not be undercut to avoid that particles get stuck in that hydraulic line. Another possibility in the state of the art to further reduce the diameter of the hydraulic line is to provide a filter this line, but this increases the costs of the hydraulic unit. With the inventive damping volume in the servo unit, which allows lowering the shift rate, the diameter for the hydraulic line supplying hydraulic fluid under shift pressure to the servo unit can be selected bigger, thereby reducing the risk that the hydraulic line gets clogged. Particles can pass through the hydraulic line and the servo unit without causing any damage.

In a preferred embodiment of the invention the damping volume is fluidly connectable via one or more damping flow passages with the first front face and/or the second front face of the servo piston. Alternatively, the damping volume can be supplied with or drained of hydraulic fluid by a separate damping line, e.g. connected to the high or low pressure conducting line or any other system pressure line of the hydraulic unit. Furthermore, the damping line is preferably equipped with a pressure reducing orifice as mentioned above that regulates the supply/drainage of hydraulic fluid in, respectively from the damping volume.

In another preferred embodiment the damping volume is supplied with hydraulic fluid under a pressure higher than a pressure level present in the casing of the hydraulic unit, wherein hydraulic fluid is drained from the damping volume via damping flow passages provided in the circumferential surface of the servo piston and/or the circumferential surface of the servo cylinder, when the servo piston is pressurized on the first front face. Thereby the damping flow passages fluidly connect the damping volume with the second front face of the servo piston, which itself is connected fluidly to a hydraulic fluid reservoir collecting hydraulic fluid preferably under case pressure in the casing, or in a tank in which normally atmospheric pressure prevails.

In another implementing embodiment of the invention the damping volume is fluidly connectable via a first damping line to a hydraulic line conducting hydraulic fluid under a shift pressure and/or via a second damping line connected to the hydraulic reservoir provided inside or outside of a casing of the hydraulic unit. For this purpose an adjustable damping orifice can be provided too in one of the first or the second damping line.

Further preferably the second front face is fluidly connected to a hydraulic reservoir or tank provided inside or outside of a casing of the hydraulic unit. This permits draining of hydraulic fluid from the damping volume by leakage or drainage channels provided in the servo cylinder or the servo piston.

In operation the first front face of the servo piston can be pressurized by hydraulic fluid under a shift pressure. This hydraulic fluid under a shift pressure can be branched off, e.g. from the high pressure side of the hydraulic unit, for instance by commanding a solenoid by means of a control unit to switch a valve from an open position to a close position or vice versa. However, possibilities for the supply of hydraulic fluid under a shifting pressure to the first front face of the servo piston being high enough to move the servo piston from a first, initial position to a second, operated position—or the other way round—are well known for a person with relevant skills in the art. Therefore, further details in this regards can be omitted here. However, the force generated on the first front face by the hydraulic fluid under shifting pressure has to be higher than the force acting on the second front face of the servo piston, which is caused too by pressurized hydraulic fluid, e.g. by hydraulic fluid under case pressure or low pressure.

In a preferred and simple embodiment of to the invention the first front face is a fully-faced circular surface, wherein the second front face is a ring-shaped surface as normally a piston rod or something similar is attached to the second front face connecting the servo piston with the adjustment element of the driving mechanism of the hydraulic unit. In this case pressure acting on simultaneously or both front faces, the first front face and second front face, can be of equal height in order to force the servo piston into its second operated position, in which the damping surface of the servo piston abuts against the shoulder surface of the servo cylinder.

In another preferred embodiment a servo spring is located at the second front face for pushing back the servo piston into a position within the servo unit, in which the adjustment element is in its first, initial position, if the pressure acting on the first front face falls below a threshold shift pressure level.

DETAILED DESCRIPTION

Figure 1:
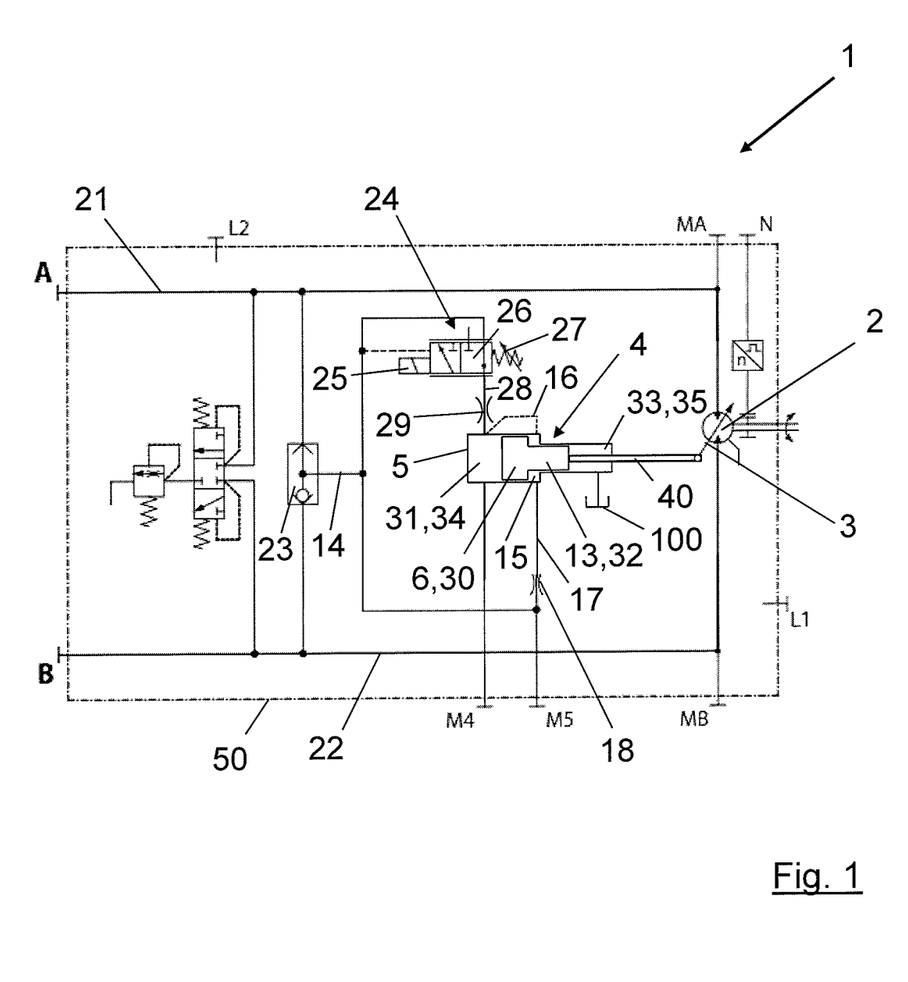
FIG. 1 shows a schematic presentation of a hydraulic unit according to the present disclosure.

Referring to FIG. 1, a hydraulic unit 1 is enclosed in a casing 50 and comprises a driving mechanism 2, for example a variable driving mechanism, whose displacement volume is determined by the position of an adjustment element 3. This adjustment element 3 may be positioned, for example, by a lever or piston rod 40 connected to a swash plate or to any other suitable mechanism for setting the operational parameters of the motor. The position of the adjustment element 3 is controlled by means of a servo unit 4 comprising a servo cylinder 5 and a servo piston 6 slidably mounted therein. Both, the servo piston 6 and the servo cylinder 5 have two sections of different diameter, as shown in detail in FIG. 2.

Driving mechanism 2 is fluidly connected to two pressure lines, e.g. a high pressure line 21 that supplies hydraulic fluid under high pressure and a low pressure line 22 that drains fluid from the driving mechanism 2. It is clear that this configuration, shown in an exemplary manner in FIG. 1, can be reversed such that the role of the pressure lines is changed, with low pressure line 22 acting as a high pressure line and vice versa. Both pressure lines can be connected to a closed hydraulic fluid circuit between a pump, not shown in FIG. 1, and the driving mechanism 2.

As shown in FIG. 1, a hydraulic line 14 connected to a two-way check valve 23 branches off from high pressure line 21 and leads to control valve 24. Control valve 24 has an outlet line 28 with a pressure reducing orifice 29 that leads to servo cylinder 5. Fluid flows through the control valve 24, and regulates the pressure level in a front chamber of the servo cylinder 5 by means of an actuator 25, acting on one side of a control piston 26. The actuator 25 is energized by a control unit, not shown in FIG. 1. An adjustable spring 27, whose action opposes that of actuator 25, is provided for moving control piston 26 in control valve 24 back to the initial position, when the actuator 25 is de-energized. Outlet line 28 of control valve 24 supplies hydraulic fluid under shift pressure via an orifice 29 to servo cylinder 5. This pressure acts accordingly on the first front face 7 of servo piston 6 and is capable to move the servo piston 6 into its second, operated position in the servo cylinder.

Figure 2:
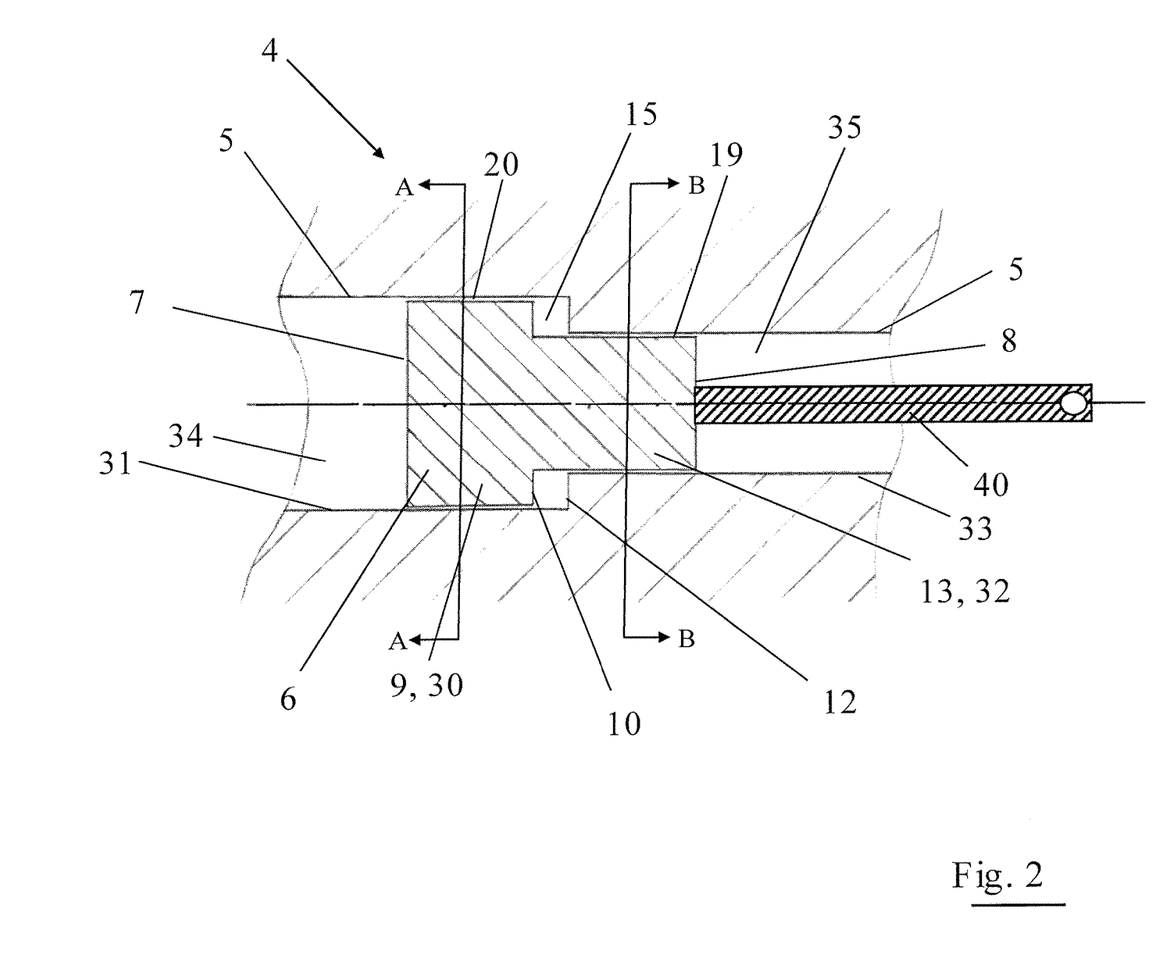
FIG. 2 depicts a partial longitudinal cross-section of a servo piston and a servo cylinder according to the present disclosure.

Servo piston 6 is of a stepped configuration and has two sections of different diameters as shown in more detail in FIG. 2. A front section 30 of a larger diameter having a first front face 7 is slide-able in a front section 31 of servo cylinder 5. A rear section 32 of servo piston 6 is of a smaller diameter than the front section 30 and slides in a correspondingly smaller rear section 33 of servo cylinder 5. A second front face 8 of servo piston 6 is connected to a piston rod 40 which in turn is connected to the adjustment element 3 of driving mechanism 2 (not shown in FIG. 2).

Figure 3:
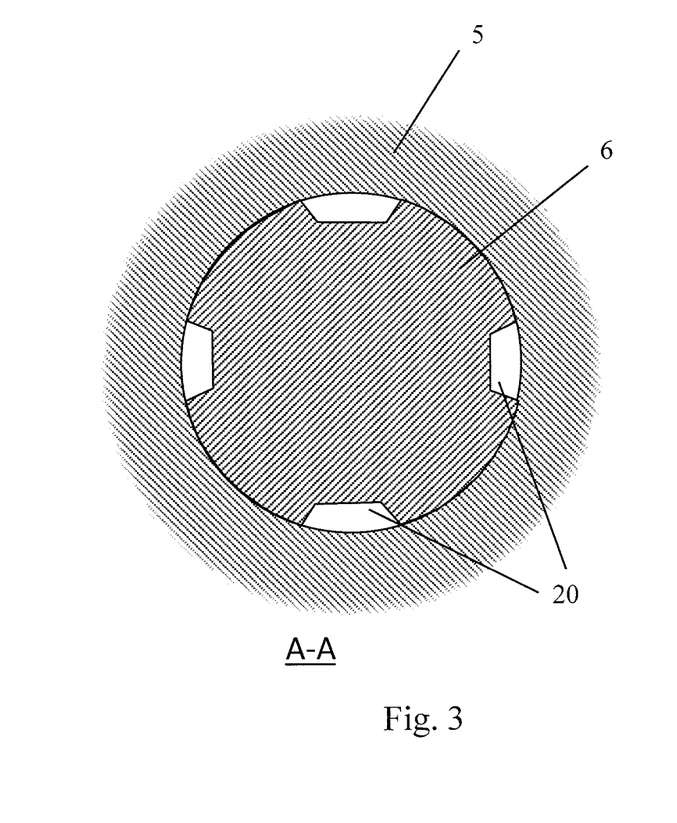
FIG. 3 shows an enlarged cross-sectional view of the servo piston and servo cylinder of FIG. 2 along section line A-A according to an embodiment.
Figure 4:
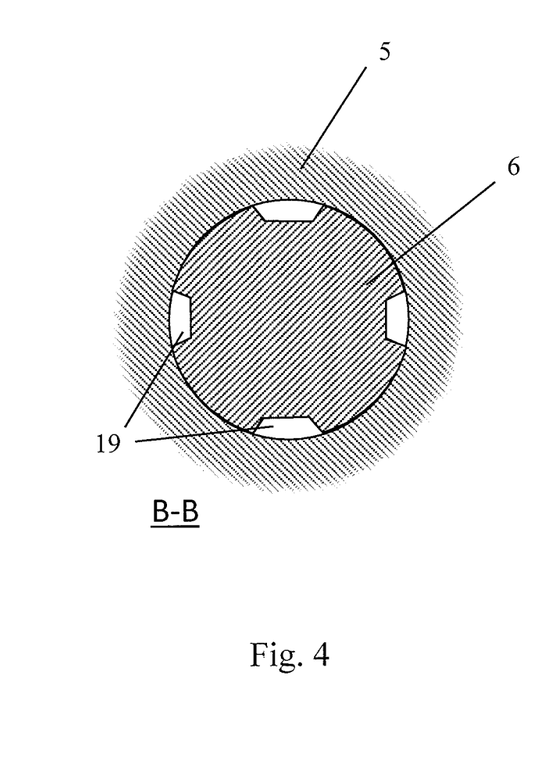
FIG. 4 shows an enlarged cross-sectional view of the servo piston and servo cylinder of FIG. 2 along section line B-B according to an embodiment.
Figure 5:
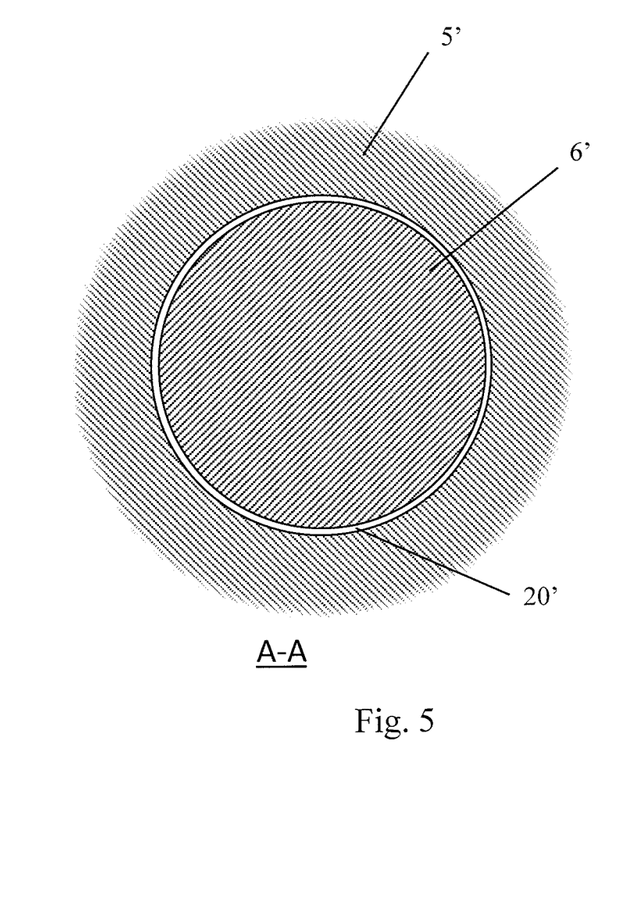
FIG. 5 shows an enlarged cross-sectional view of the servo piston and servo cylinder of FIG. 2 along section line A-A according to an embodiment.
Figure 6:
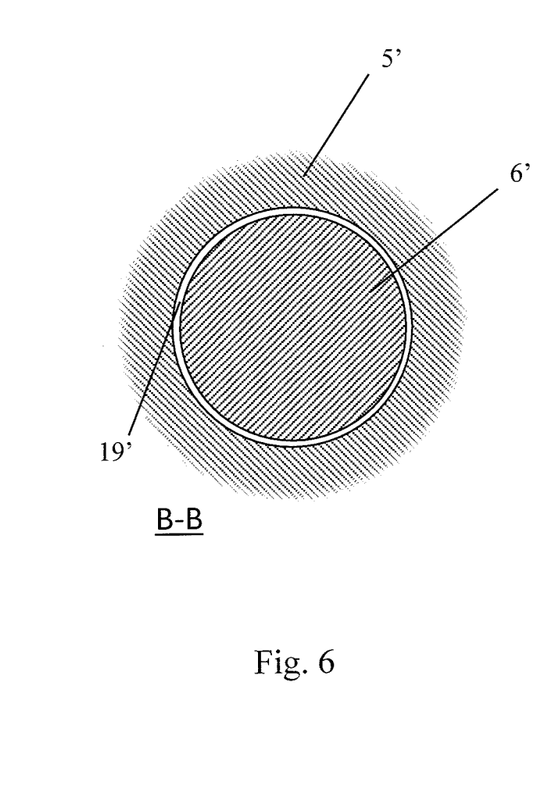
FIG. 6 shows an enlarged cross-sectional view of the servo piston and servo cylinder of FIG. 2 along section line B-B according to an embodiment.

At the transition between the two sections 31 and 32 of servo piston 6 a circular area is provided that forms damping surface 10. Similarly a shoulder surface 12 is present at the transition region of servo cylinder 5. Damping surface 10 and shoulder surface 12 are facing each other. In the configuration shown in FIG. 2 these surfaces define a damping volume 15 that is in fluid connection with either the front chamber 34 or the rear chamber 35 of servo cylinder 5 or with both. Referring also to FIGS. 3 and 4, such fluid connection can be provided, for example, through damping flow passages 19 and/or 20 formed on the circumferential surfaces of the front and/or rear sections 30, 32 of servo piston 6 and/or the circumferential surfaces of the front and/or rear sections of servo cylinder 5. Although the damping flow passages 19 and 20 are shown as having a particular shape for illustrative purposes, the damping flow passages may be formed in various other shapes, such as semi-cylindrical passages or the like. Alternatively, referring to FIGS. 5 and 6, wherein like numerals represent like elements, a small mismatch between the diameters of the different sections of servo cylinder 5' and servo piston 6' may be sufficient to form the damping flow passages 19' and/or 20' that provide the required amount of fluid flow for displacing/draining or filling-up the damping volume 15, shown in FIG. 2. Here, the damping flow passages 19' and/or 20' are formed by the spaces between the opposing circumferential surfaces of servo cylinder 5' and servo piston 6'.

Referring again to FIG. 1, damping volume 15 may be connected via a first damping line 17 and damping orifice 18 to low pressure line 22. This permits to fill the damping volume 15 with pressurized fluid at a reduced pressure. The damping volume 15 may also be fluidly connected via a second damping line 16 to a hydraulic line 14 conducting hydraulic fluid under a shift pressure, thereby permitting the damping volume 15 to be filled with pressurized fluid under shift pressure. Damping volume 15 is drained, e.g., via leakage to rear chamber 35 of servo cylinder 5 and subsequent to hydraulic reservoir 100 or a tank or a sump.

In order to describe the operation of hydraulic unit 1, it is assumed for purpose of illustration only that servo piston 6 is in the embodiment shown in FIG. 1 at its initial position on the right side of servo cylinder 5. In this configuration, the damping volume 15 is at its minimum extent and the damping surface 10 of servo piston 6 abuts against the shoulder surface 12 of the servo cylinder 5. Upon command from the control unit of hydraulic unit 1, control valve 24 enables drainage from the front chamber 34 to a reservoir with low pressure, which e.g. is incorporated in the casing, or to a tank 100. At the same time, outlet line 28 is closed by control spool 26.

Due to the pressure decrease in front chamber 34 of the servo unit 4, the damping volume 15 can be filled with hydraulic fluid provided through damping flow passages 19, 20 or the first damping line 17 connected to low pressure line 22. As the pressure in the damping volume 15 is now higher than the pressure in front chamber 34, the servo piston 6 together with the piston rod 40 is moved—according to the embodiment shown in FIG. 1—towards the left, to minimize the front chamber 34. In this position, the driving mechanism 2 is set by the adjustment element 3 to its minimum displacement.

When the control valve is de-energized again, i.e. the actuator 25 is de-energized, control valve spring 27 pushes the control spool 26 back to its initial position, in which outlet line 28 is open and front chamber 34 is pressurized via outlet line 28 with hydraulic fluid under shift pressure, here high pressure derived from high pressure working line 21 and reduced by orifice 29. This causes a force to the right side on first front face 7 of servo piston 6 to bring the servo piston 6 into its initial position. However, this movement according to the present disclosure is dampened by the displacement of the damping volume 15 such that a stroke-like movement towards the right is avoided. Instead, the motion of the servo piston 6 in the servo cylinder 5 is slowed down. At the very right side in the servo cylinder 5 the servo piston 6 abuts (again) in its initial position with its damping surface 10 coming into proximity of the shoulder surface 12 of servo cylinder 5. In this position, the servo piston 6 sets the displacement volume of the driving mechanism 2 to its maximum.

Figure 7:
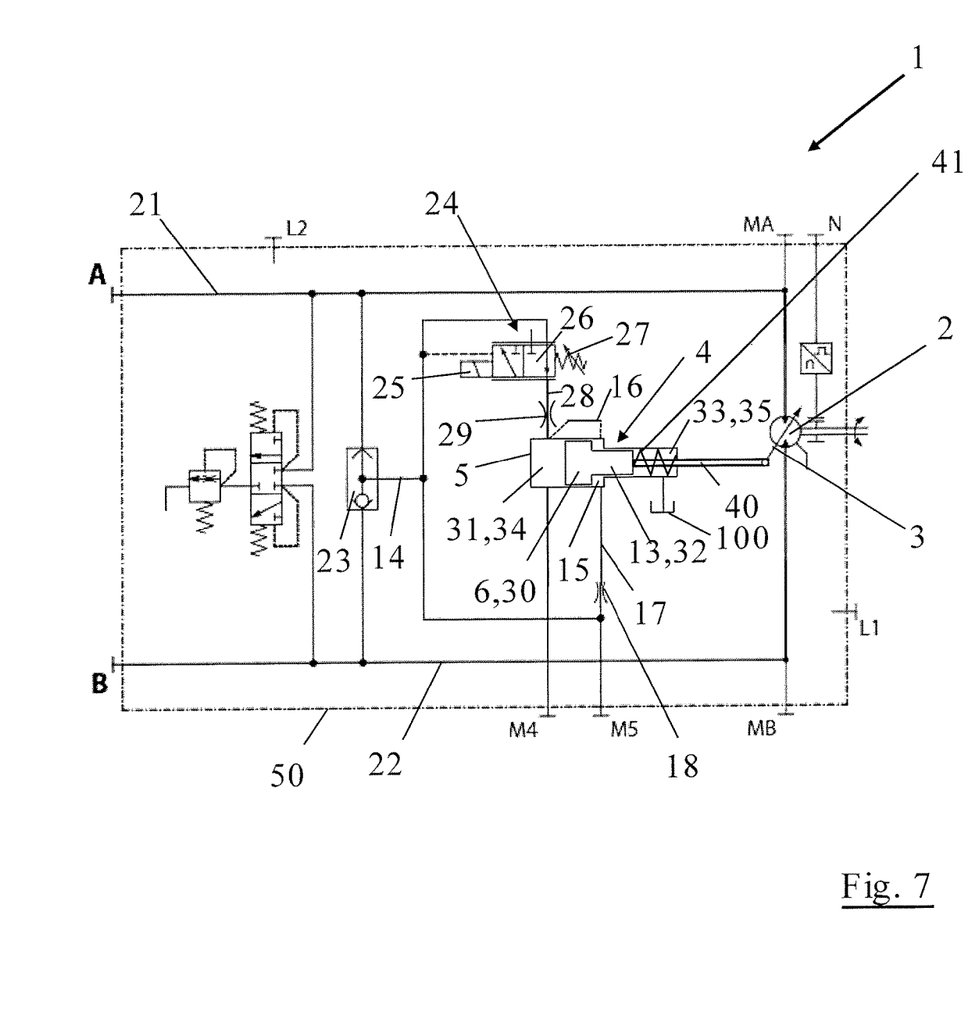
FIG. 7 shows a schematic presentation of a hydraulic unit according to the present disclosure.

Referring to FIG. 7, in embodiments a servo spring 41 may be located at the second front face 8, shown in FIG. 2, for pushing back the servo piston 6 into a position within the servo unit 4, in which the adjustment element 3 is in its first, initial position, if the pressure acting on the first front face 7, shown in FIG. 2, falls below a threshold shift pressure level.

According to the present disclosure, the movement of servo piston 6 is damped by the presence of fluid in damping volume 15. This fluid resists the sudden movement of servo piston 6 and permits a relatively slow motion determined by the rate of drainage of fluid from damping volume 15. The damping rate depends on the pressure in damping volume 15 and on the drainage rate through the different drainage channels provided, for example, by damping flow passage 19 leading to hydraulic reservoir 100. a person with relevant skills in the art that these parameters can be selected according to the application into which the hydraulic unit should be implemented.

Thus, the configuration of servo unit 4 according to the invention leads to a controlled, damped motion of the servo piston 6 under high shifting pressure conditions, and thereby leads to a controlled positioning of the adjustment element 3 and consequently to a controlled corresponding response of driving mechanism 2. In this manner the problems in this regard associated with servo units of the conventional design are remedied.

What is claimed is:

1. A hydraulic unit (1) having a driving mechanism (2) whose displacement volume is adjustable to two operational states through movement of a positionable adjustment element (3) which itself can be positioned through movement of a servo piston (6) of a servo unit (4) into a first, initial position and a second, operated position, wherein a first front face (7) of the servo piston (6) opposes a second front face (8) of the servo piston (6), wherein the first front face (7) can be pressurized with pressurized hydraulic fluid for positioning the servo piston (6) at one end of a servo cylinder (5) of the servo unit (4),
wherein the servo piston (6) is of a stepped design thereby forming a ring-shaped damping surface (10) opposing the first front face (7), wherein in the servo cylinder (5) a ring-shaped shoulder surface (12) is formed correspondingly and opposing the damping surface (10) such that a damping volume (15) is formed in the servo cylinder (5) by the damping surface (10), the shoulder surface (12) and the servo cylinder (5), and wherein the damping volume (15) is drained via damping flow passages (19, 19') to a rear chamber (35) of servo cylinder (5) and subsequent to a hydraulic reservoir (100).

2. The hydraulic unit (1) according to claim 1, wherein the damping volume (15) is fluidly connectable via one or more damping flow passages (20) with the first front face (7).

3. The hydraulic unit (1) according to claim 1, wherein the hydraulic reservoir (100) is provided inside or outside of a casing (50) of the hydraulic unit (1).

4. The hydraulic unit (1) according to claim 1, wherein the first front face (7) is adapted to be pressurized by hydraulic fluid under a shift pressure.

5. The hydraulic unit (1) according to claim 1, wherein the damping volume (15) is fluidly connectable via a first damping line (16) to a hydraulic line (14) conducting hydraulic fluid under a shift pressure.

6. The hydraulic unit (1) according to claim 5, wherein an adjustable damping orifice (18) is provided in the first damping line(16).

7. The hydraulic unit (1) according to claim 1, wherein a servo spring is located at the second front face (8) for pushing the servo piston (6) into a position within the servo unit (4) in which the adjustment element (3) is in its first, initial position, if the pressure acting on the first front face (7) falls below shift pressure.

8. The hydraulic unit (1) according to claim 7, wherein the hydraulic unit (1) is at maximum displacement when the servo piston (6) is in its initial position.

9. A hydraulic unit (1) having a driving mechanism (2) with an adjustment element (3) for adjusting displacement volume, the hydraulic unit comprising:
a servo unit (4) having a servo cylinder (5) and a servo piston (6) movable within the servo cylinder (5), the servo piston (6) having a first front face (7) on one end thereof and a second front face (8) on an opposite end thereof, the first front face (7) adapted to be pressurized with pressurized hydraulic fluid for positioning the servo piston (6) toward an opposite end of the servo cylinder (5) of the servo unit (4),
wherein the servo piston (6) has a stepped design with a step between the first front face (7) and second the front face (8) that forms a ring-shaped damping surface (10) opposite the first front face (7), and wherein the servo cylinder (5) includes a ring-shaped shoulder surface (12) formed correspondingly and opposing the damping surface (10) to form a damping volume (15) in the servo cylinder (5) between the damping surface (10), the shoulder surface (12) and the servo cylinder (5), and wherein the damping volume (15) is drained via damping flow passages (19, 19') to a rear chamber (35) of servo cylinder (5) and subsequent to a hydraulic reservoir (100).

10. The hydraulic unit (1) according to claim 9, wherein the damping volume (15) is fluidly connectable via one or more damping flow passages (20) with the first front face (7).

11. The hydraulic unit (1) according to claim 9, wherein the hydraulic reservoir (100) is provided inside or outside of a casing (50) of the hydraulic unit (1).

12. The hydraulic unit (1) according to claim 9, wherein the first front face (7) is adapted to be pressurized by hydraulic fluid under a shift pressure.

13. The hydraulic unit (1) according to claim 9, wherein the damping volume (15) is fluidly connectable via a first damping line (16) to a hydraulic line (14) conducting hydraulic fluid under a shift pressure.

14. The hydraulic unit (1) according to claim 13, wherein an adjustable damping orifice (18) is provided in the first damping line (16).

15. The hydraulic unit (1) according to claim 9, wherein a servo spring is located at the second front face (8) for pushing the servo piston (6) into a position within the servo unit (4) in which the adjustment element (3) is in its first, initial position, if the pressure acting on the first front face (7) falls below shift pressure.

16. The hydraulic unit (1) according to claim 15, wherein the hydraulic unit (1) is at maximum displacement when the servo piston (6) is in its initial position.

* * * * *